Nov. 8, 1960     M. WYSS     2,959,390
PILOT CONTROLLED MAIN VALVE
Filed May 1, 1958
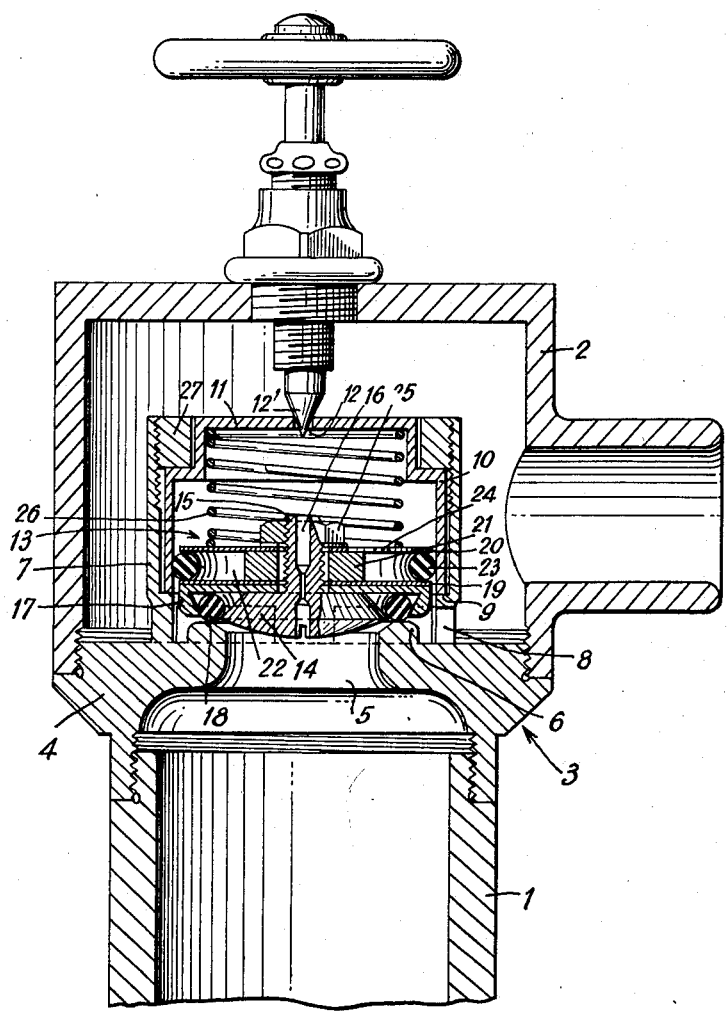

Patented Nov. 8, 1960

2,959,390
PILOT CONTROLLED MAIN VALVE

Max Wyss, Collonge-Bellerive, Switzerland, assignor to Kugler Fonderie et Robinetterie S.A., Geneva, Switzerland, a corporation of Switzerland Filed May 1, 1958, Ser. No. 732,401

Claims priority, application Switzerland Aug. 7, 1957

3 Claims. (Cl. 251—43)

This invention relates to valve devices. An object of the invention is to provide a valve device for controlling the passage of a fluid in a conduit, characterized in that the valve constitutes a piston in a cylinder provided with an orifice adapted to put, at will, the interior thereof in communication with the down-stream end of the conduit, relative to the valve, the latter having a passage putting in permanent communication the interior of the cylinder with the up-stream end of the conduit, the imperviousness between the edge of the valve and the wall of the cylinder being ensured by a flexible annular joint disposed freely between two flanges on the valve, in order to close on the outside the space existing between the latter, a passage putting in permanent communication the said space with the interior of the cylinder so that, when pressure exists in the said cylinder, it forces radially the said joint against the side wall of the cylinder.

The single figure of the drawing shows, by way of example, one embodiment, seen in section, of the device according to the invention.

The device shown is adapted to control the passage of a fluid in a conduit formed by a first pipe 1 at the up-stream end of the device, and by a second pipe 2, at the down-stream end, the two pipes being connected by a joint 3. The pipe 1 may be put in communication with a fluid source under pressure. The joint 3 consists of an annular body 4, threaded at its two ends so as to screw respectively on the pipe 1 and in the pipe 2. The body 4 is provided on its down-stream face, around its central opening 5, with a crown 6 adapted to form a seat for the movable head of a valve, as will be described hereafter. Also on its down-stream face, the body 4 of the joint 3 is provided with a cylindrical extension 7 interiorly threaded at its down-stream end and having openings 8 putting in communication the interior of the cylindrical extension 7 with the interior of the pipe 2. The cylindrical extension 7 has an inside shoulder 9 upon which bears a valve cylinder 10 open at the up-stream end at the level of the shoulder 9 and closed at its down-stream end by a bottom 11 having a central opening 12 putting in communication the interior of the cylinder 10 with the interior of the pipe 2. The said opening 12 may be closed at will by a control member, for instance a valve-needle 12'.

A valve piston 13 is mounted in the cylinder 10 and capable of sliding in the latter. It comprises a conical shaped head 14, rounded at its up-stream end and provided with a threaded rod 15 at its down-stream end. The head 14 is traversed from end to end by a contracted passage 16 putting the interior of the cylinder 10 in communication with the central opening 5 of the joint 3 itself communicating with the interior of the pipe 1. An inverted cup 17 is mounted against the down-stream face of the head 14 so as to grip between its edge and the head 14 a flexible annular joint 18 adapted to cooperate with the crown 6 of the joint 3 in order to close in a water-tight manner the opening 5 on the down-stream side when the valve piston 13 is in the position shown.

Two flanges 19 and 20 separated by a washer 21 are mounted on the down-stream face of the cup 17 and form an annular space 22 closed on the outside by a flexible annular joint 23 freely disposed between the two flanges and adapted to ensure imperviousness between the edge of the valve and the inner wall of the cylinder 10 under working conditions to be described hereafter. An opening 24 bored in the flange 20 puts in communication the space 22 between the flanges with the interior of the cylinder 10. The cup 17, the two flanges 19 and 20 and the washer 21 are held tight against the head 14 by a nut 25 screwed on the threaded rod 15. A compression spring 26 is mounted between the bottom 11 of the cylinder 10 and the flange 20 and normally forces the valve head 14 against the seat forming crown 6. A tightening ring 27 outwardly threaded is screwed to the inside of the cylindrical extension 7 of the joint 3 and presses the cylinder 10 against the shoulder 9 of the cylindrical extension 7. It is to be noted that the down-stream surface of the piston 13 constituted by the flange 20 is larger than its up-stream surface limited on the head 14 by the opening 5 of the joint 3.

The device described operates in the following manner. The pipe 1 is in communication with a source of fluid under pressure, so that if the control member 12' closes the opening 12 provided in the bottom 11 of the cylinder 10, the fluid under pressure passes through the contracted passage 16 of the valve head and puts under pressure the interior of the cylinder 10 and, because of the opening 24 provided in the flange 20, the space 22. The annular joint 23 is then expanded radially and bears strongly against the inner wall of the cylinder 10, ensuring perfect imperviousness for the fluid which can not flow at the level of the said joint. Moreover, the pressure existing inside the cylinder 10, equal to the pressure existing in the pipe 1, bears on the valve piston 13 on a surface which is larger than the surface of the head 14 defined by the opening 5 in the joint 3. It follows that the piston 13 is pushed more strongly on the down-stream side than on the up-stream side and that the joint 18 bears strongly against the crown 6 forming a seat. The fluid cannot therefore pass into the pipe 2 at the level of the joint 18. The conduit formed by the two pipes 1 and 2 and the joint 3 is thus closed and the fluid cannot escape from the pipe 1.

If now the control member uncovers the opening 12 in the bottom 11 of the cylinder 10, the pressure immediately falls inside the cylinder 10 and in the space 22. The annular joint 23 between the two flanges is no longer expanded radially and the pressure of the fluid acting against the valve head 14 pushes the piston 13 down-stream against the action of the spring 26. The annular joint 18 leaves the crown 6 and the fluid contained in the pipe 1 may pass between the joint and the crown and flow into the pipe 2 through the openings 8.

It is obvious that the piston 13 will resume the closed position shown as soon as the control member again closes the opening 12. The spring 26 fulfills two functions; it operates in the same direction as the pressure existing inside the cylinder 10 contributing to ensure the closure of the device, and it permits a rapid closure of the device when the control member closes the opening 12.

What I claim is:

1. A valve device comprising coaxial inlet and outlet conduits, a joint connecting said conduits and defining an opening between the latter, cylinder means in said outlet conduit spaced from said joint and having an open end opposed to said opening, said cylinder means being substantially closed at its other end with a wall having an aperture therethrough opening into said outlet conduit, means for opening and closing said aperture, differential piston means slidable in said cylinder means and adapted for substantially closing said opening, said piston means having a passage permanently communicating said opening with the apertured end of said cylinder means whereby with said aperture closed said piston means is urged to a position whereat said opening is substantially closed, said cylinder means including a support on said joint and having at least one hole connecting the interior of the cylinder means with the outlet conduit, said piston means including a portion at one end engageable with said joint to isolate said hole from said opening and further including flanges at the other end thereof defining an annular chamber and a resilient device radially displaceable in said chamber to engage frictionally said cylinder means, one of said flanges having a passage between the interior of said cylinder means and said chamber whereby said resilient device is controlled by pressure in said cylinder means.

2. A valve device as claimed in claim 1 comprising a spring in said cylinder means and acting against said piston means so as to urge the latter against said joint at said opening.

3. A valve device as claimed in claim 1 wherein said portion included by said piston is an annular resilient ring.

References Cited in the file of this patent
UNITED STATES PATENTS

| | | |
|---|---|---|
| 457,005 | McNeil | Aug. 4, 1891 |
| 2,608,990 | Crockett | Sept. 2, 1952 |
| 2,655,172 | Owens | Oct. 13, 1953 |
| 2,655,174 | Towler | Oct. 13, 1953 |
| 2,854,995 | Lornitzo | Oct. 7, 1958 |